United States Patent
Drachmann et al.

(10) Patent No.: US 10,184,822 B2
(45) Date of Patent: Jan. 22, 2019

(54) METHOD AND A SYSTEM FOR TEST AND CALIBRATION OF WIRELESS CONSUMPTION METERS

(71) Applicant: APATOR MIITORS ApS, Aarhus V (DK)

(72) Inventors: Jens Drachmann, Viby J (DK); Kresten Helstrup, Hasselager (DK); Thorbjorn Borup, Aarhus V (DK)

(73) Assignee: Apator Miitors ApS, Aarhus V (DK)

( * ) Notice: Subject to any disclaimer, the term of this patent is extended or adjusted under 35 U.S.C. 154(b) by 177 days.

(21) Appl. No.: 15/327,291

(22) PCT Filed: Jul. 18, 2014

(86) PCT No.: PCT/DK2014/050228
§ 371 (c)(1),
(2) Date: Jan. 18, 2017

(87) PCT Pub. No.: WO2016/008485
PCT Pub. Date: Jan. 21, 2016

(65) Prior Publication Data
US 2017/0160124 A1 Jun. 8, 2017

(51) Int. Cl.
*G01F 25/00* (2006.01)
*G01D 4/00* (2006.01)
(Continued)

(52) U.S. Cl.
CPC .......... *G01F 25/0007* (2013.01); *G01D 4/002* (2013.01); *G01D 18/00* (2013.01);
(Continued)

(58) Field of Classification Search
CPC ........ G01D 4/002; G01D 18/00; G01D 21/00; G01F 1/58; G01F 25/0007; Y02B 90/241
See application file for complete search history.

(56) References Cited

U.S. PATENT DOCUMENTS 7,039,529 B2 * 5/2006 Keech .................... G01D 4/004
702/45
7,324,913 B2 * 1/2008 Clark ............... G01R 31/31717
324/500

(Continued)

FOREIGN PATENT DOCUMENTS

CN 103164941 A 6/2013
WO 2006083996 A2 8/2006
(Continued)

*Primary Examiner* — David A Rogers
(74) *Attorney, Agent, or Firm* — Lee & Hayes, P.C.

(57) ABSTRACT

A wireless consumption meter, such as an ultrasonic flow meter, and a test and calibration system; the wireless consumption meter including a test mode which changes the wireless communication parameters to transmit less data, with less power, faster and more often, than in a normal operating mode. The test and calibration system includes test boxes arranged to receive measurement data from the consumption meters under the test mode circumstances and a common control unit arranged to control the start and stop of the testing and to establish a test or calibration result based on the received measurements from the consumption meters and by comparing with a reference value from a reference device. Further, methods performed by the consumption meter and the test and calibration system are disclosed.

20 Claims, 3 Drawing Sheets

(51) Int. Cl.
*G01D 18/00* (2006.01)
*G01F 1/66* (2006.01)

(52) U.S. Cl.
CPC .............. *G01F 1/66* (2013.01); *Y02B 90/241* (2013.01); *Y02B 90/246* (2013.01); *Y04S 20/32* (2013.01); *Y04S 20/42* (2013.01)

(56) References Cited

U.S. PATENT DOCUMENTS

| | | | | |
|---|---|---|---|---|
| 9,633,350 | B2* | 4/2017 | Post | G06K 7/14 |
| 2005/0102058 | A1* | 5/2005 | Reinsch | G01G 13/18 |
| | | | | 700/231 |
| 2005/0159116 | A1* | 7/2005 | Xiong | H04W 52/50 |
| | | | | 455/127.1 |
| 2006/0235629 | A1* | 10/2006 | Walker | G01F 1/74 |
| | | | | 702/45 |
| 2008/0078252 | A1* | 4/2008 | Graber | G01F 1/60 |
| | | | | 73/861.16 |
| 2009/0206059 | A1 | 8/2009 | Kiko | |
| 2010/0313958 | A1 | 12/2010 | Patel et al. | |
| 2011/0046903 | A1* | 2/2011 | Franklin | G01M 3/2815 |
| | | | | 702/51 |
| 2012/0109258 | A1* | 5/2012 | Cinbis | A61B 5/0028 |
| | | | | 607/60 |
| 2012/0274396 | A1* | 11/2012 | Jang | G01R 31/31721 |
| | | | | 327/539 |
| 2013/0193773 | A1* | 8/2013 | Van Wageningen | H02J 7/025 |
| | | | | 307/104 |
| 2015/0007670 | A1* | 1/2015 | Brockhaus | G01F 1/58 |
| | | | | 73/861.12 |
| 2015/0226597 | A1* | 8/2015 | Gaspard, Jr. | G01F 25/0007 |
| | | | | 73/1.16 |
| 2015/0330818 | A1* | 11/2015 | Leaders | G01F 1/667 |
| | | | | 73/861.28 |
| 2016/0072434 | A1* | 3/2016 | Wachi | H03B 5/24 |
| | | | | 331/117 FE |
| 2017/0086363 | A1* | 3/2017 | Tribelhorn | A01C 23/007 |

FOREIGN PATENT DOCUMENTS

| | | |
|---|---|---|
| WO | 2009132425 A1 | 11/2009 |
| WO | 2013050037 A1 | 4/2013 |

* cited by examiner

METHOD AND A SYSTEM FOR TEST AND CALIBRATION OF WIRELESS CONSUMPTION METERS

FIELD OF THE INVENTION

The present invention relates to a method and a system for test and calibration of wireless consumption meters, and such wireless consumption meters, such as ultrasonic flow meters for measuring a flow and determining a consumption of water, gas or another fluid.

BACKGROUND OF THE INVENTION

When a wireless consumption meter is being tested and/or calibrated, the amount of data transmitted from the consumption meter is typically much larger than the amount transmitted during normal operation. Apart from potential problems with regulatory requirements restricting such transmissions with respect to how often and how much may be transmitted in terms of duty cycle, effect, etc., the increased amount of data to be transmitted also severely reduces the expected lifetime of the battery supplying the consumption meter, as data transmission is one of the most power-consuming functions of most such consumption meters.

Another critical factor in such test and calibration situations is the fact that the loss of just a single data package, which is not at all unlikely when using wireless communication, may cause incorrect calibration of the consumption meter, often without possibility of recognizing that an error has happened.

SUMMARY OF THE INVENTION

It is an object of the present invention to provide a method and a system for test and calibration of wireless consumption meters, which overcome the above-mentioned disadvantages related to such methods and systems known in the art.

In an aspect, the present invention relates to a wireless consumption meter for measuring one or more values, e.g. accumulated volume, relating to a fluid flowing in a connected fluid pipe system, the wireless consumption meter being arranged with at least two modes of operation comprising at least a normal operation mode having associated a normal operation algorithm, and a test mode having associated a test mode algorithm different from the normal operation mode algorithm;

the wireless consumption meter comprising a parameter storage which at least comprises wireless communication parameters that the wireless consumption meter is arranged to use for wireless transmission of measurement data to an external device;

the wireless communication parameters at least comprising transmitting signal power, baud rate, and data package type;

and wherein a value of at least one of the wireless communication parameters is different when the wireless consumption meter is set to test mode compared to when set to normal operation mode, in accordance with transmitting signal power being lower in test mode than in normal operation mode, baud rate being higher in test mode than in normal operation mode, and/or data package type being a type of generally smaller size in test mode than in normal operation mode.

According to the invention, a wireless consumption meter is provided with a particularly advantageous test mode for allowing test and calibration of the consumption meter faster, more accurate and with less battery consumption than previously.

In a preferred embodiment the wireless consumption meter is an ultrasonic flow meter for measuring an accumulated volume of water flow. The consumption meter may have more modes of operation than mentioned above, e.g. a turned off or standby mode, a service mode, etc. The parameter storage may e.g. be implemented as a database, a table, data classes or structures, variables, constants or simply be integrated in the algorithms or functions where they are used; in all cases somehow stored in the consumption meter or derivable from something stored in the consumption meter, even if received runtime from an external device.

The use of a higher baud rate means that the energy used for transmitting the data packages is reduced. Furthermore, the duty cycle of the transmissions from a given consumption meter is reduced by using a higher baud rate, which is relevant because the duty cycle may be subject to regulatory restrictions, such as for instance only transmitting $\frac{1}{1000}$ of the time.

Reducing the transmit power in the test mode is possible because the test box will typically be placed significantly closer to the consumption meter than the central data processing unit, to which the consumption meter transmit data packages in normal operation mode. The use of less transmit power results in less reduction of the lifetime of the battery in the consumption meter and less problems with regulatory restrictions on the allowed amount of data transmitted.

An advantageous embodiment is obtained, when the parameter storage comprises normal operation mode parameters and test mode parameters for storage and lookup of the wireless communication parameters to use in normal operation mode and test mode, respectively.

An advantageous embodiment is obtained, when the wireless communication parameters comprise one or more of transmission interval and modulation method, and wherein the transmission interval is smaller in test mode than in normal operation mode and/or a modulation method is of a more spectrum-efficient type in test mode than in normal operation mode.

Shorter transmission interval, i.e. sending measurements more often than in normal operation mode, reduces the time required for testing and increases the accuracy, e.g. because measurements used for interpolation are closer in time. Increased baud rate, decreased transmitting power, and reduced package size help counteract the possibly negative effects on battery consumption and duty cycle caused by more frequent transmissions.

Many modulation methods affect the spectrum, e.g. the bandwidth, negatively with increasing baud rate. Therefore a preferred embodiment involves changing to a more spectrum-compact modulation method when the consumption meter is put in test mode and the baud rate preferably increased significantly. In normal operation mode with long transmission interval, low baud rate and focus on as little processing as possible due to battery consumption, a simple modulation method, e.g. frequency shift keying FSK, may be satisfactory. With increased baud rate and reduced transmission interval, the test mode may preferably utilize a more advanced modulation method, e.g. unidirectional phase shift keying UPSK or m-ary frequency shift keying, e.g. 8-FSK.

It is noted that also several other modulation methods are known in the art with different advantages and disadvantages, and any suitable modulation method is considered within the scope of the invention.

An advantageous embodiment is obtained, when the transmitting signal power in test mode is 50% or less of the transmitting signal power in normal operation mode, in the test mode preferably in a range of 0.01-50 mW, more preferably in a range of 0.1-1 mW.

An advantageous embodiment is obtained, when the baud rate in test mode is at least 200% of the baud rate in normal operation mode, in the test mode preferably in a range of 24-400 kBaud, more preferably in a range of 150-250 kBaud.

An advantageous embodiment is obtained, when the data package type in test mode is of a type with a size determined by number of bits of 50% or less of the size of data packages in the normal operation mode, in test mode preferably with a size of less than 150 bits, more preferably less than 75 bits.

An advantageous embodiment is obtained, when the data package type in test mode defines a data package comprising at least an identifier or a part of an identifier for the wireless consumption meter and a measurement value, and preferably not a timestamp.

An advantageous embodiment is obtained, when the data package type in test mode is of a type with a size in terms of bits being smaller than the size of data packages in the normal operation mode, the smaller data package in test mode compared to normal operation mode being arranged by the wireless consumption meter by arranging any or all of preamble, synchronization and header fields with a reduced size and arranging the payload field with preferably only a measurement value.

An advantageous embodiment is obtained, when the transmission interval in test mode in average is $1/10^{th}$ or less of the transmission interval in normal operation mode, in the test mode preferably less than one second in average, more preferably less than 500 ms in average, e.g. 400 ms in average.

An advantageous embodiment is obtained, when the transmission interval in test mode varies between transmissions, preferably by a pseudo-random variation.

An advantageous embodiment is obtained, when the wireless consumption meter performs measurements at regular measurement intervals, but transmits the measurement with data packages at variable, preferably irregular or pseudo-random, transmission intervals.

An advantageous embodiment is obtained, when the transmission interval variation is derived from a data package or a part thereof so that a receiver of the data package may be able to determine the applied transmission interval variation.

An advantageous embodiment is obtained, when the transmission interval variation is derived from a checksum included in the data package that is to be transmitted.

An advantageous embodiment is obtained, when the wireless consumption meter comprises a control input and wherein the wireless consumption meter is arranged to enable an external device to request the wireless consumption meter to change from normal operation mode to test mode via said control input.

An advantageous embodiment is obtained, when the control input comprises a radio receiver, preferably arranged to receive a request for change of mode of operation by Near Field Communication (NFC), preferably at a frequency between 10 MHz and 100 MHz and over a distance of less than 50 cm, preferably less than 10 cm.

Using radio communication and specifically Near Field Communication, for instance at the commonly used NFC frequency of 13.56 MHz, for initiating the switching between normal operation mode and test mode of the consumption meters means that this can be performed in a very simple way by communication from the test box, which will typically be placed in the vicinity of the consumption meter.

By using the short range NFC technology for communication with the control input of the consumption meter is avoided that other consumption meters nearby are able to receive the control signals from the external device. Thereby is for example ensured that only the intended consumption meter is put into test mode by transmission of such request from an external device. Also, the certainty obtained by requiring the external device, e.g. a test box, to be placed practically right beside or on top of a consumption meter to control it, also means that when a test result, a rejection or acceptance, etc., of a consumption meter has been established, or when an automatic fluid diverting system is applied for arranging the fluid pipe system, it is simple to determine which physical consumption meter that a certain test box is communicating with.

An advantageous embodiment is obtained, when the wireless consumption meter is arranged to enable said external device via said control input to control the measuring of values and/or transmission of data packages, e.g. when to start and stop measuring and/or transmitting, or request change of the wireless communication parameters in said parameter storage.

An advantageous embodiment is obtained, when the measured value is accumulated volume of fluid, and wherein the representation of the accumulated volumes in the data packages in test mode has a precision corresponding to a volume of $10^{-6}$ liter, preferably to a volume of $10^{-7}$ liter, and preferably higher than the precision in normal operation mode.

Transmitting data packages with relatively short time intervals and a very high precision in the representation of the accumulated volumes (compared to normal operation mode, in which the time interval between the transmissions of data packages is typically 10 seconds or more and the precision of the volumes typically corresponds to deciliters or even liters) means that the test and calibration can be performed efficiently within a relatively short time.

An advantageous embodiment is obtained, when the wireless consumption meter is an ultrasonic flow meter.

In an aspect, the present invention relates to a method for a wireless consumption meter to engage in a consumption meter test session, the wireless consumption meter being arranged to measure one or more values, e.g. accumulated volume, relating to a fluid flowing in a connected fluid pipe system, and the wireless consumption meter is arranged with at least two modes of operation comprising at least a normal operation mode having associated a normal operation algorithm, and a test mode having associated a test mode algorithm different from the normal operation mode algorithm;

the method comprising the steps of:

changing mode of operation to said test mode;

measuring a value relating to said fluid flow;

transmitting a data package comprising a representation of said measured value, the transmission being performed in accordance with wireless communication parameters comprising transmitting signal power, baud rate, and data package type;

repeating the measuring and transmitting steps;

wherein the transmission of data packages in test mode is performed by the wireless consumption meter in accordance with one or more of transmitting with a lower transmitting signal power than in normal operation mode, transmitting at a higher baud rate than in normal operation mode, and/or transmitting generally smaller data packages than in normal operation mode.

It is noted that the repeating the measuring and transmitting steps involves frequently making updated measurements and transmitting the updated measurements.

An advantageous embodiment is obtained, when the step of transmitting data packages in test mode is repeated (with new measurements) in correspondence with a smaller transmission interval than in normal operation mode.

An advantageous embodiment is obtained, when the transmitting with a lower transmitting signal power involves a transmitting signal power of 50% or less compared to normal operation mode, in test mode preferably in a range of 0.01-50 mW, more preferably in a range of 0.1-1 mW.

An advantageous embodiment is obtained, when the transmitting at a higher baud rate involves a baud rate of at least 200% compared to normal operation mode, in the test mode preferably in a range of 24-400 kBaud, more preferably in a range of 150-250 kBaud, and/or wherein a modulation method is of a more spectrum-efficient type in test mode than in normal operation mode.

An advantageous embodiment is obtained, when the transmitting generally smaller data packages involves a data package type with a size determined by number of bits of 50% or less compared to the normal operation mode, in test mode preferably with a size of less than 150 bits, more preferably less than 75 bits.

An advantageous embodiment is obtained, when the data package type in test mode defines a data package comprising at least an identifier or a part of an identifier for the wireless consumption meter and a measurement value, and preferably not a timestamp.

An advantageous embodiment is obtained, when the transmitting of a smaller data package type than in normal operation mode, involves preparing the smaller data package with any or all of preamble, synchronization and header fields of a reduced size compared to normal operation mode and with the payload field preferably comprising only a measurement value.

An advantageous embodiment is obtained, when the step of transmitting data packages in test mode is repeated in correspondence with a transmission interval being in average $1/10^{th}$ or less of the transmission interval in normal operation mode, in the test mode preferably less than one second in average, more preferably less than 500 ms in average, e.g. 400 ms in average.

An advantageous embodiment is obtained, when the transmission interval in test mode varies between transmissions, preferably by a pseudo-random variation.

An advantageous embodiment is obtained, when the step of measuring a value relating to said fluid flow in test mode is repeated at regular measurement intervals, but the step of transmitting the data package comprising the measured value is repeated at variable, preferably irregular or pseudo-random, transmission intervals.

An advantageous embodiment is obtained, when the transmission interval variation is derived from a data package or a part thereof so that a receiver of the data package may be able to determine the applied transmission interval variation.

An advantageous embodiment is obtained, when the transmission interval variation is derived from a checksum included in the data package that is to be transmitted.

An advantageous embodiment is obtained, when the step of changing mode of operation to said test mode is preceded by a step of receiving a request from a test box to change to test mode.

An advantageous embodiment is obtained, when the step of receiving a request from a test box is performed by radio communication, preferably by Near Field Communication (NFC), preferably at a frequency between 10 MHz and 100 MHz and over a distance of less than 50 cm, preferably less than 10 cm.

An advantageous embodiment is obtained, when the method comprises a step of enabling said test box to control the measuring of values and/or transmission of data packages, e.g. when to start and stop measuring and/or transmitting, or request change of the wireless communication parameters in said parameter storage.

An advantageous embodiment is obtained, when the measured value is accumulated volume of fluid, and wherein the representation of the accumulated volumes in the data packages in test mode has a precision corresponding to a volume of $10^{-6}$ liter, preferably to a volume of $10^{-7}$ liter, and preferably higher than the precision in normal operation mode.

An advantageous embodiment is obtained, when the wireless consumption meter is an ultrasonic flow meter.

An aspect of the invention relates to a method for test and calibration of wireless consumption meters, such as ultrasonic flow meters, comprising the steps of:

arranging sequentially one or more consumption meters and a reference device in any order with a fluid pipe system to allow fluid to flow through the consumption meters and said reference device;

providing one or more test boxes in wireless communication with the consumption meters;

making the consumption meters, which are arranged to operate in accordance with at least a normal operation mode and a test mode, change to the test mode;

transmitting from the consumption meters, via said wireless communication, data packages to the test boxes, the data packages comprising representations of measured values related to said fluid;

establishing a test or calibration result for one or more of said consumption meters on the basis of said data packages;

wherein said step of transmitting data packages from the consumption meters, in test mode, are performed in accordance with one or more of transmitting with a lower transmitting signal power than in normal operation mode, transmitting at a higher baud rate than in normal operation mode, and/or transmitting generally smaller data packages than in normal operation mode.

The arranging of the consumption meters and reference device with a fluid pipe system to allow fluid to flow through the consumption meters and reference device refers to any appropriate way of connection the reference device, consumption meters and pipes together, so that fluid, e.g. water, can flow through all the devices and meters, so they all measure the same fluid flow. It is noted, that different consumption meter types engages with the fluid in different ways, including by inserting items into the flow, monitoring the flow from the inside wall of a pipe, or not penetrating the pipe at all, but all those are considered within the scope of the conceptual term of "flowing through the consumption meter", and thereby within the scope of the invention.

An advantageous embodiment is obtained, when the step of transmitting data packages in test mode is repeated in correspondence with a smaller transmission interval than in normal operation mode.

An advantageous embodiment is obtained, when the transmitting with a lower transmitting signal power involves a transmitting signal power of 50% or less compared to normal operation mode, in test mode preferably in a range of 0.01-50 mW, more preferably in a range of 0.1-1 mW.

An advantageous embodiment is obtained, when the transmitting at a higher baud rate involves a baud rate of at least 200% compared to normal operation mode, in the test mode preferably in a range of 24-400 kBaud, more preferably in a range of 150-250 kBaud, and/or wherein a modulation method is of a more spectrum-efficient type in test mode than in normal operation mode.

An advantageous embodiment is obtained, when the transmitting generally smaller data packages involves a data package type with a size determined by number of bits of 50% or less compared to the normal operation mode, in test mode preferably with a size of less than 150 bits, more preferably less than 75 bits.

An advantageous embodiment is obtained, when the data package type in test mode defines a data package comprising at least an identifier or a part of an identifier for the wireless consumption meter and a measurement value, and preferably not a timestamp.

An advantageous embodiment is obtained, when the transmitting of a smaller data package type than in normal operation mode, involves preparing the smaller data package with any or all of preamble, synchronization and header fields of a reduced size compared to normal operation mode and with the payload field preferably comprising only a measurement value.

An advantageous embodiment is obtained, when the step of transmitting data packages in test mode is repeated in correspondence with a transmission interval being in average $1/10^{th}$ or less of the transmission interval in normal operation mode, in the test mode preferably less than one second in average, more preferably less than 500 ms in average, e.g. 400 ms in average.

An advantageous embodiment is obtained, when the transmission interval in test mode varies between transmissions, preferably by a pseudo-random variation.

An advantageous embodiment is obtained, when the measuring of values relating to said fluid flow in the consumption meters in test mode is repeated at regular measurement intervals, but the step of transmitting the data packages comprising the measured values is repeated at variable, preferably irregular or pseudo-random, transmission intervals.

An advantageous embodiment is obtained, when the transmission interval variation is derived from the data packages or a part thereof so that the test boxes receiving the data packages may be able to determine the applied transmission interval variation.

An advantageous embodiment is obtained, when the transmission interval variation is derived from a checksum included in a data package that is about to be transmitted.

An advantageous embodiment is obtained, when the step of making the consumption meters change to said test mode is performed by the test boxes by sending a request to the consumption meters to change to test mode.

An advantageous embodiment is obtained, when sending a request from a test box to a consumption meter is performed by radio communication, preferably by Near Field Communication (NFC), preferably at a frequency between 10 MHz and 100 MHz and over a distance of less than 50 cm, preferably less than 10 cm.

An advantageous embodiment is obtained, when the method comprises said test boxes controlling the measuring of values and/or transmission of data packages in the consumption meters, e.g. when to start and stop measuring and/or transmitting, or request change of transmitting signal power, baud rate or data package type.

An advantageous embodiment is obtained, when the measured value is accumulated volume of fluid, and wherein the representation of the accumulated volumes in the data packages in test mode has a precision corresponding to a volume of $10^{-6}$ liter, preferably to a volume of $10^{-7}$ liter, and preferably higher than the precision in normal operation mode.

An advantageous embodiment is obtained, when the method comprises a step of transmitting a common start signal to all test boxes simultaneously, after the consumption meters have been changed to test mode; and a step of transmitting a common stop signal to all test boxes simultaneously, after the start signal has been sent; and wherein said step of transmitting data packages is repeated several times between said common start and stop signals, and preferably also one or more times before the common start signal and one or more times after the common stop signal.

An advantageous embodiment is obtained, when the step of establishing a test or calibration result for a particular consumption meter involves determining a start value and a stop value based on measured values measured at or near the time of the common start signal and the common stop signal, respectively, and received with said data packages from said particular consumption meter; and comparing with a reference measurement value obtained from said reference device.

An advantageous embodiment is obtained, when said determining a start value and a stop value based on measured values involves interpolation to the time of the common start and stop signal, respectively, based on received measured values measured before and after the time of the common start and stop signal, respectively.

An advantageous embodiment is obtained, when the step of establishing a test or calibration result is performed by a common control unit communicating with the test boxes; and wherein the test boxes enhances, by appending at least a time stamp, the one or more data packages received from the consumption meters and forwards the enhanced data packages to the common control unit.

In an embodiment of the invention, the data packages received by the one or more test boxes are forwarded along with the corresponding time recordings to a common control unit for establishing of the start and stop volumes, calculation of the test volumes and comparison with the volumes recorded by the one or more reference devices, which control unit also transmits relevant control signals to the one or more test boxes and the consumption meters.

The use of a common control unit for controlling the tests and performing the calculations means that the need for computational power in the test boxes can be reduced to a minimum, thus reducing the cost price and improving the reliability of the test boxes. The test boxes do not need to decode the data packages (or even know from which consumption meter they originate) as long as they are time stamped correctly and forwarded to the common control unit. This means that new types of consumption meters can be tested with the test system without having to change anything within the test boxes.

An advantageous embodiment is obtained, when the appending of a time stamp involves calculating a measurement time from a data package reception time by subtracting a transmission interval variation.

An advantageous embodiment is obtained, when the test box derives the transmission interval variation from the received data package, preferably from a checksum thereof.

An advantageous embodiment is obtained, when the enhancing of data packages by the test boxes involves appending a timestamp related to the most recently received common start signal, a timestamp related to the most recently received common stop signal, and preferably an identifier for the test box.

An advantageous embodiment is obtained, when the step of transmitting a common start signal and the step of transmitting a common stop signal is initiated by the common control unit.

An advantageous embodiment is obtained, when the step of transmitting a common start signal and the step of transmitting a common stop signal is performed by one of the reference devices or one of the test boxes on request from the common control unit.

An advantageous embodiment is obtained, when the test boxes and the common control unit communicates by network, preferably by Ethernet network, more preferably at least partly by network arranged to also power the test boxes.

An aspect of the invention relates to a test and calibration system for wireless consumption meters, such as ultrasonic flow meters, comprising one or more test boxes, one or more reference devices and a fluid pipe system;
the reference devices and fluid pipe system being arranged in sequential connection in any order with one or more wireless consumption meters to be tested; the arrangement being configured for the consumption meters to measure one or more values, e.g. accumulated volume, relating to a fluid flowing in the fluid pipe system;
the one or more test boxes comprising a radio signal receiver for wirelessly receiving data packages comprising measurements from said wireless consumption meters to be tested; wherein the radio signal receiver is arranged to receive data packages that are transmitted in accordance with a consumption meter test mode different from a consumption meter normal operation mode, and wherein the radio signal receiver correspondingly is arranged to receive data packages under circumstances of
    transmitting signal power being lower than in normal operation mode,
    baud rate being higher than in normal operation mode, and/or
    data package type being a type of generally smaller size than in normal operation mode.

An advantageous embodiment is obtained, when the radio signal receiver is further arranged to receive data packages under circumstances of one or more of reception interval being smaller than in normal operation mode, and a modulation method is of a more spectrum-efficient type in test mode than in normal operation mode.

An advantageous embodiment is obtained, when the transmitting signal power in test mode is 50% or less of the transmitting signal power in normal operation mode, in the test mode preferably in a range of 0.01-50 mW, more preferably in a range of 0.1-1 mW.

An advantageous embodiment is obtained, when the baud rate in test mode is at least 200% of the baud rate in normal operation mode, in the test mode preferably in a range of 24-400 kBaud, more preferably in a range of 150-250 kBaud.

An advantageous embodiment is obtained, when the data package type in test mode is of a type with a size determined by number of bits of 50% or less of the size of data packages in the normal operation mode, in test mode preferably with a size of less than 150 bits, more preferably less than 75 bits.

An advantageous embodiment is obtained, when the data package type in test mode defines a data package comprising at least an identifier or a part of an identifier for the wireless consumption meter to be tested and a measurement value, and preferably not a timestamp.

An advantageous embodiment is obtained, when the data package type in test mode is of a type with a size in terms of bits being smaller than the size of data packages in the normal operation mode, the smaller data package in test mode having any or all of preamble, synchronization and header fields with reduced size and the payload field with preferably only a measurement value.

An advantageous embodiment is obtained, when the reception interval in test mode in average is $\frac{1}{10}^{th}$ or less of the reception interval in normal operation mode, in the test mode preferably less than one second in average, more preferably less than 500 ms in average, e.g. 400 ms in average.

An advantageous embodiment is obtained, when the reception interval in test mode varies between transmissions, preferably by a pseudo-random variation.

An advantageous embodiment is obtained, when the data packages are received at varying, preferably irregular, reception intervals but represent measurements made at regular measurement intervals by the consumption meters to be tested.

An advantageous embodiment is obtained, when the test boxes are arranged to derive a reception interval variation from the data packages or a part thereof so as to determine the transmission interval variation applied by the consumption meter to be tested.

An advantageous embodiment is obtained, when the test boxes are arranged to derive the transmission interval variation applied by the consumption meter to be tested from a checksum included in the data package that is to be transmitted.

An advantageous embodiment is obtained, when the test boxes comprise a radio signal transmitter and are arranged to transmit a request the wireless consumption meters to be tested to change to test mode via said radio signal transmitter.

An advantageous embodiment is obtained, when the radio signal transmitter is a Near Field Communication (NFC) transmitter, preferably operating at a frequency between 10 MHz and 100 MHz and over a distance of less than 50 cm, preferably less than 10 cm.

An advantageous embodiment is obtained, when the test boxes are arranged to control via the radio signal transmitter the consumption meters to be tested, e.g. their measuring of values and/or transmission of data packages, e.g. when to start and stop measuring and/or transmitting, or request change of wireless communication parameters.

An advantageous embodiment is obtained, when the measured values received with the data packages are accumulated volumes of fluid, and wherein the representations of the accumulated volumes in the data packages in test mode have a precision corresponding to a volume of $10^{-6}$ liter, preferably to a volume of $10^{-7}$ liter, and preferably higher than the precision in normal operation mode.

An advantageous embodiment is obtained, when the wireless consumption meters to be tested are ultrasonic flow meters.

An advantageous embodiment is obtained, when the wireless consumption meters to be tested comprise a wireless consumption meter in accordance with the above-described.

An advantageous embodiment is obtained, when the test and calibration system is arranged to transmit a common start signal to all the test boxes simultaneously, after the test boxes have been set to test mode and preferably after the test boxes have received one or more data packages from each consumption meter to be tested; wherein the test and calibration system is arranged to transmit a common stop signal to all the test boxes simultaneously, after the test boxes have received several data packages from each consumption meter to be tested.

An advantageous embodiment is obtained, when the test and calibration system is arranged to establish a test or calibration result for a particular consumption meter by determining a start value and a stop value based on measured values measured at or near the time of the common start signal and the common stop signal, respectively, and received with said data packages from said particular consumption meter; and comparing with a reference measurement value obtained from said reference device.

An advantageous embodiment is obtained, when said determining a start value and a stop value based on measured values involves interpolation to the time of the common start and stop signal, respectively, based on received measured values measured before and after the time of the common start and stop signal, respectively.

An advantageous embodiment is obtained, when the test and calibration system comprises a common control unit communicatively coupled to the test boxes; wherein the common control unit is arranged to perform the establishing a test or calibration result; and wherein the test boxes comprises a timer unit and a micro controller arranged to enhance, by appending at least a time stamp from said timer unit, the data packages received from the consumption meters; and the test boxes further being arranged to forward the enhanced data packages to the common control unit.

An advantageous embodiment is obtained, when the micro controllers of the test boxes are arranged to calculate a measurement time from a data package reception time by subtracting a transmission interval variation, in order to determine the time stamp to append.

An advantageous embodiment is obtained, when the micro controllers are arranged to derive the transmission interval variations from the received data packages, preferably from checksums thereof.

An advantageous embodiment is obtained, when the micro controllers are arranged to append a timestamp related to the most recently received common start signal, a timestamp related to the most recently received common stop signal, and preferably an identifier for the test box, in relation to the enhancing of data packages.

An advantageous embodiment is obtained, when the common control unit is arranged to initiate the transmission of the common start signal and the common stop signal.

An advantageous embodiment is obtained, when one of the reference devices or one of the test boxes are arranged to transmit the common start signal and the common stop signal on request from the common control unit.

An advantageous embodiment is obtained, when the communicative coupling between the test boxes and the common control unit comprises a network, preferably an Ethernet network, more preferably at least partly a network arranged to also power the test boxes.

An advantageous embodiment is obtained, when the test boxes are configured to be relatively water proof, preferably to the IP54 or IP65 standard or better.

The test methods and systems, and consumption meters described above are advantageous for several reasons.

The system is robust in the sense that it works even if one or more data packages are lost in the wireless transmission from the consumption meter to the test box. The consumption meter is in the test mode and transmitting data packages to the test box preferably from before the start signal is given until after the stop signal is given. This means that there will always be a data package that is the latest one received by the test box before the start or stop signal, respectively, and another data package that is the first one received after the start or stop signal, respectively. Thus, it is generally possible to perform the linear interpolations to calculate the start volume and the stop volume, because each data package contains a representation of the accumulated volume at the time of transmission of that specific data package. Should one or more data packages be lost in transmission, it only means that the interpolation will be performed between two data packages with a larger time interval and that, therefore, the precision of the calibration will be slightly reduced.

Another advantage is that when the data packages are reduced to contain only the meter ID and the representation of the accumulated volume, the transmitted data packages will be shorter in the test mode than in normal operation mode, in which the data packages further contains a "time stamp" and possibly other data. Shorter data packages result in less power used for transmission and, thereby, less reduction of the lifetime of the battery in the consumption meter and less problems with regulatory restrictions on the allowed amount of data transmitted.

Furthermore, the fact that the start and stop of the test and the calibrations performed on the received data packages do not involve the consumption meter means that updates and modifications of the test method can be implemented by modifying the relatively few test boxes only without having to make any alterations in all the consumption meters.

Even further, the simultaneous arrival of the start signal and the stop signal to all test boxes and reference devices means that the time difference between the two signals is experienced to be exactly the same for all relevant parts of the test system. The absolute time and the period between the start signal and the stop signal are not critical as long as the start signal and the stop signal, respectively, are registered simultaneously in all test boxes and reference devices.

If the test system comprises more than one test box, each of the test boxes can receive data packages from each consumption meter being tested/calibrated, whereby the probability of reception of all the data packages is increased.

The present invention relates to a method for test and calibration of wireless consumption meters, such as ultrasonic flow meters, said method comprising the steps of switching one or more consumption meters from a normal operation mode, wherein data packages are transmitted wirelessly to a central and possibly distant data processing unit, to a test mode, wherein data packages are instead transmitted wirelessly to one or more test boxes, data packages from a given consumption meter being transmitted with substantially regular time intervals to one or more test boxes, each data package comprising only a minimum of information including a consumption meter ID and a representation of the accumulated volume having passed through the consumption meter of a fluid to be metered, the time of reception of each data package being recorded by a microcontroller in the test box by which the data package is received, preferably with a precision of one millisecond or less, creating an electronic start signal and an electronic stop signal, each of which is controlled to reach all test boxes and one or more reference devices used for calibration of the one or more consumption meters simultaneously, each reference device being arranged in series with one or more consumption meters to be passed by the same volume of fluid to be metered as the consumption meters with which it is arranged in series, establishing a start volume for each of the consumption meters by linear interpolation between the volume representations in the data packages received from a given consumption meter immediately before and after the start signal, respectively, establishing a stop volume for each of the consumption meters by linear interpolation between the volume representations in the data packages received from a given consumption meter immediately before and after the stop signal, respectively, calculating the test volume passing through each of the consumption meters in the time interval between the start signal and the stop signal by subtracting the start volume from the stop volume for each of the consumption meters, comparing the test volume of each of the consumption meters with a volume recorded by the relevant reference device for calibration of the individual consumption meter, and switching the one or more consumption meters back to normal operation mode.

In an aspect of the invention, it relates to a system for test and calibration of wireless consumption meters, such as ultrasonic flow meters, said system comprising one or more test boxes, one or more consumption meters arranged to be able to switch from a normal operation mode to a test mode and back again, wherein, in the normal operation mode, data packages are transmitted wirelessly to a central and possibly distant data processing unit, whereas, in the test mode, data packages are instead transmitted wirelessly to the one or more test boxes, data packages from a given consumption meter being transmitted with substantially regular time intervals to one or more test boxes, each data package comprising only a minimum of information including a consumption meter ID and a representation of the accumulated volume having passed through the consumption meter of a fluid to be metered, a timer unit in each test box arranged to send timing information to a microcontroller in the test box for recording the time of reception of each data package being received by that test box, preferably with a precision of one millisecond or less, a central timing device arranged to create an electronic start signal and an electronic stop signal, each of which is controlled to reach all test boxes and one or more reference devices used for calibration of the one or more consumption meters simultaneously, each reference device being arranged in series with one or more consumption meters to be passed by the same volume of fluid to be metered as the consumption meters with which it is arranged in series, one or more processor units arranged to be able to establish a start volume for each of the consumption meters by linear interpolation between the volume representations in the data packages received from a given consumption meter immediately before and after the start signal, respectively, establish a stop volume for each of the consumption meters by linear interpolation between the volume representations in the data packages received from a given consumption meter immediately before and after the stop signal, respectively, calculate the test volume passing through each of the consumption meters in the time interval between the start signal and the stop signal by subtracting the start volume from the stop volume for each of the consumption meters, compare the test volume of each of the consumption meters with a volume recorded by the relevant reference device for calibration of the individual consumption meter.

BRIEF DESCRIPTION OF THE DRAWINGS

In the following, the invention is described in more detail with reference to the drawings, where.

DETAILED DESCRIPTION OF THE INVENTION

Figure 1:
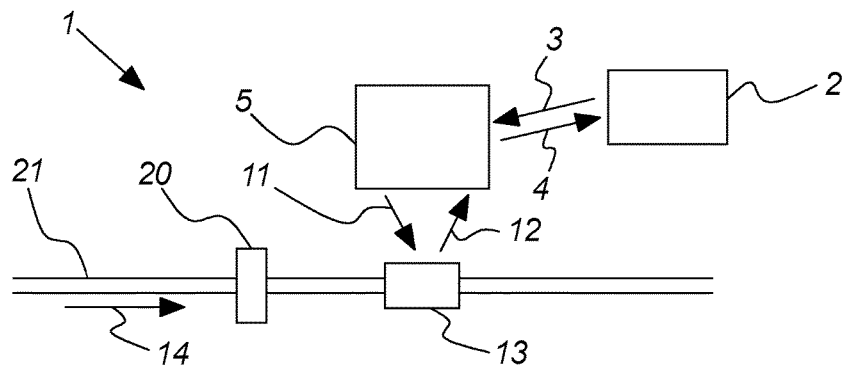
FIG. 1 is a schematic illustration of a test system according to an embodiment of the invention.

FIG. 1 illustrates schematically a test system 1 according to an embodiment of the invention. A fluid pipe 21 facilitates a fluid flow as indicated by arrow 14 through the test system 1. The fluid pipe may be any suitable type or combination of types of pipe, tube or hose appropriate for the particular type of fluid and the applied fluid pressure, whether rigid or flexible, whether based on metal, rubber, plastic, etc., whether being lined, reinforced and/or covered, whether being thin or thick walled, etc., and regardless of types of fittings and joints.

A consumption meter 13 to be tested and/or calibrated is coupled to the fluid pipe 21 and arranged to measure a value representing a fluid passing through, typically a volume of the fluid. The fluid may e.g. be water, hot water, gas, or another fluid, and the consumption meter may e.g. be a water flow meter, such as e.g. an ultrasonic flow meter, or a flow meter appropriate for the particular fluid.

Also arranged in connection with fluid pipe 21 is a reference device 20 configured to measure a reference value of a fluid flow through the fluid pipe, typically a reference value corresponding to the value measured by the consumption meter, typically a volume of the fluid. The reference device 20 may e.g. be a pre-calibrated consumption meter, a positive displacement liquid calibrator or linear prober, or a diverter and scale-setup. The measured reference value is used for calibration of consumption meter 13 as explained in more detail below.

The test system 1 of FIG. 1 further comprises a test box 5 and a common control unit 2. The test box 5 communicates with the consumption meter, and the common control unit communicates with the test box, as also described in more detail below. The test box 5 and the common control unit 2 may be distributed as illustrated, or integrated as one device.

Figure 2:
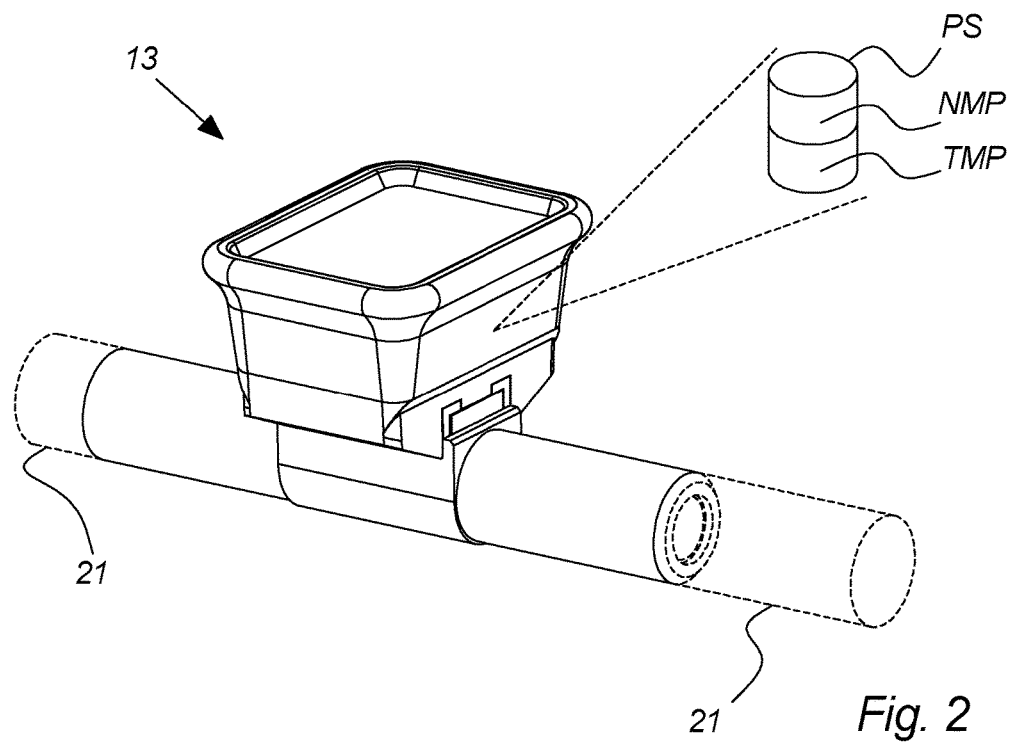
FIG. 2 is an example embodiment of a consumption meter according to the present invention.

FIG. 2 is an example embodiment of a wireless consumption meter 13 according to the present invention. It is configured to be connectable to the fluid pipe 21 by any suitable fitting or joint so as to be able to perform its measuring method on the fluid in the fluid pipe 21, typically by letting the fluid flow through a piece of pipe integrated with the consumption meter 13 and allowing ultrasonic transceivers, propellers, paddlewheels or other flow metering technologies of the particular consumption meter to gain access to the fluid. Besides the necessary measuring arrangement for the particular type of consumption meter, the wireless consumption meter 13 comprises a wireless communication arrangement, typically radio frequency based or optical, and a power source, typically a battery.

The consumption meter 13 according to an embodiment of the present invention further comprises a parameter storage PS for storing parameters and rules for wireless communication of data. The parameter storage may e.g. be implemented as a database, a table, data classes or structures, variables, constants or simply be integrated in the algorithms or functions where they are used; in all cases somehow stored in the consumption meter or derivable from something stored in the consumption meter. The consumption meter 13 is arranged to be able switch between a normal operation mode and a test mode, and the parameter storage PS preferably comprises both normal operation mode parameters NMP for use in the normal operation mode and test mode parameters TMP for use in the test mode. In a preferred embodiment, the normal operation mode parameters NMP and test mode parameters TMP are pre-configured in the consumption meter 13, and may in various embodiments be adjustable or fixed. In an alternative embodiment, the parameter storage only comprises one set of parameters, which may be changed programmatically, e.g. by commands received, e.g. from the test box 5 of FIG. 1, by wireless communication, e.g. when changing from normal operation mode to test mode or vice versa.

In a preferred embodiment of the invention, the parameter storage PS may comprise values as seen in Tables 1-3 below. It is noted that the particular parameters and their values are examples, and any parameters and values compatible with the general principle of the present invention is considered within the scope of the invention.

TABLE 1

Example of parameter storage PS

| | Normal Operation mode parameters NMP | Test mode Parameters TMP |
|---|---|---|
| Transmitting signal power | High | Low |
| Baud rate | Low | High |
| Data package size | Full | Reduced |

If the parameter storage comprises relative values or references as in the example of Table 1, a further table or other data structure may preferably hold absolute values associated therewith. Besides being an example, Table 1 also indicates in principle how the normal operation mode and the test mode are different in a preferred embodiment of the invention. Generally, as an example of a preferred embodiment, the signal power in test mode is max 50% of the normal operation mode signal power, the baud rate in test mode is at least 200% of the normal operation mode baud rate, and the data package size is max 50% of the normal operation mode data package size.

In a preferred embodiment the test mode is configured with different communication parameters than the normal operation mode for several reasons.

Decreased signal power is possible because the test box 5 during testing or calibration in a preferred embodiment is located near, possibly adjacent, to the consumption meter 13, and the reduced signal power makes the calibration procedure spare on the limited battery resources.

The increased baud rate, i.e. transmission rate in symbols per second, during test mode decreases the effective transmission distance, which is positive because the test box preferably is within very short distance anyway, and the reduced range reduces the area that is affected by the radio transmissions. Further, the increased baud rate also reduces the transmission time of each data package, which again saves battery resources. The latter is also the effect of the decreased package size, saving transmission time and in turn battery resources.

TABLE 2

Another example of parameter storage PS

| | Normal Operation mode parameters NMP | Test mode Parameters TMP |
|---|---|---|
| Transmitting signal power | 50 mW | 10 mW |
| Baud rate | 32 kBaud | 100 kBaud |
| Data package size | 300-500 bit | 150 bit |

TABLE 3

Yet another example of parameter storage PS

| | Normal Operation mode parameters NMP | Test mode parameters TMP |
|---|---|---|
| Transmitting signal power | 10 mW | 0.5 mW |
| Baud rate | 100 kBaud | 200 kBaud |
| Data package size | 200 bit | 100 bit |

In various embodiments further parameters may be different between normal operation mode and test mode. In a preferred embodiment the transmission interval between each data package transmission is significantly reduced in test mode. In normal operation mode, the transmission interval is for example decided by balancing battery consumption and the desire for frequent updates of e.g. water consumption, which in various embodiments may lead to selecting transmission intervals in the range of 5 seconds to several minutes between each measurement transmission, e.g. 12-16 seconds. In the test mode the transmission interval is preferably significantly shorter, e.g. tenths of seconds, e.g. 400 ms. As the testing and/or calibration requires several measurements, the reduced transmission intervals in test mode reduces the overall time required for carrying out the calibration, and again helps saving on battery resources, etc.

The data packages comprise several fields of different sizes, and several of these may be reduced in test mode according to preferred embodiments of the invention. The data packages may for example in an embodiment comprise a preamble, a synchronization field, a header, a payload and a checksum.

The preamble and synchronization fields may in an embodiment be used for initialization and synchronization on bit and byte level, respectively. In normal operation mode, depending on the environment, distances, etc., these fields alone collectively consumes up to e.g. 64 bits of the data package. In test mode where the transmission range is very short, synchronization may typically be achieved with significantly fewer bits for these two fields.

The header field may in an embodiment in normal operation mode identify the consumption meter and convey information regarding communication mode and protocol variants, encryption, package size, etc., requiring e.g. another 32-64 bits of information. In test mode, the header may be significantly reduced, as the data packages in test mode in a preferred embodiment only have the purpose of transmitting flow measurement values, thereby possibly enabling predefined values for payload type, protocol, length, etc. Also the identification of the consumption meter may be optimized to save bits in various ways when realizing that only a few possible consumption meters are typically within the reduced range during the testing procedure. Various embodiments and methods of reducing the size needed to identify the consumption meter are for example disclosed in the International Patent Application with Publication No. WO 2013/050037 A1, hereby incorporated by reference.

The payload may in an embodiment in normal operation mode comprises several different kinds of data and information e.g. measurements of flow volume, flow rate, temperature, previously logged values, etc., meter state, e.g. detected leaks, unauthorized manipulation attempts, no water in the pipe, etc., errors, e.g. memory error, non-planned resets, low battery, and e.g. time information. The payload may therefore in normal operation mode changes size from data packages to data package, as well as information about the content, encoding, data structure, etc., and to that purpose implement a data exchange standard such as MBus or Zigbee, in turn adding a little further overhead. In test mode, however, as mentioned above, the payload will in a preferred embodiment only comprise a measurement value, typically a volume, where both the content and payload size, e.g. 32 or 64 bit, may be predetermined when test mode is entered.

The checksum may in an embodiment be one or more bits achieved by package-wide or field-wide arithmetic, e.g. one or more CRC checksums. In a preferred embodiment, the checksum field is maintained both in normal operation mode and in test mode.

Figure 3:
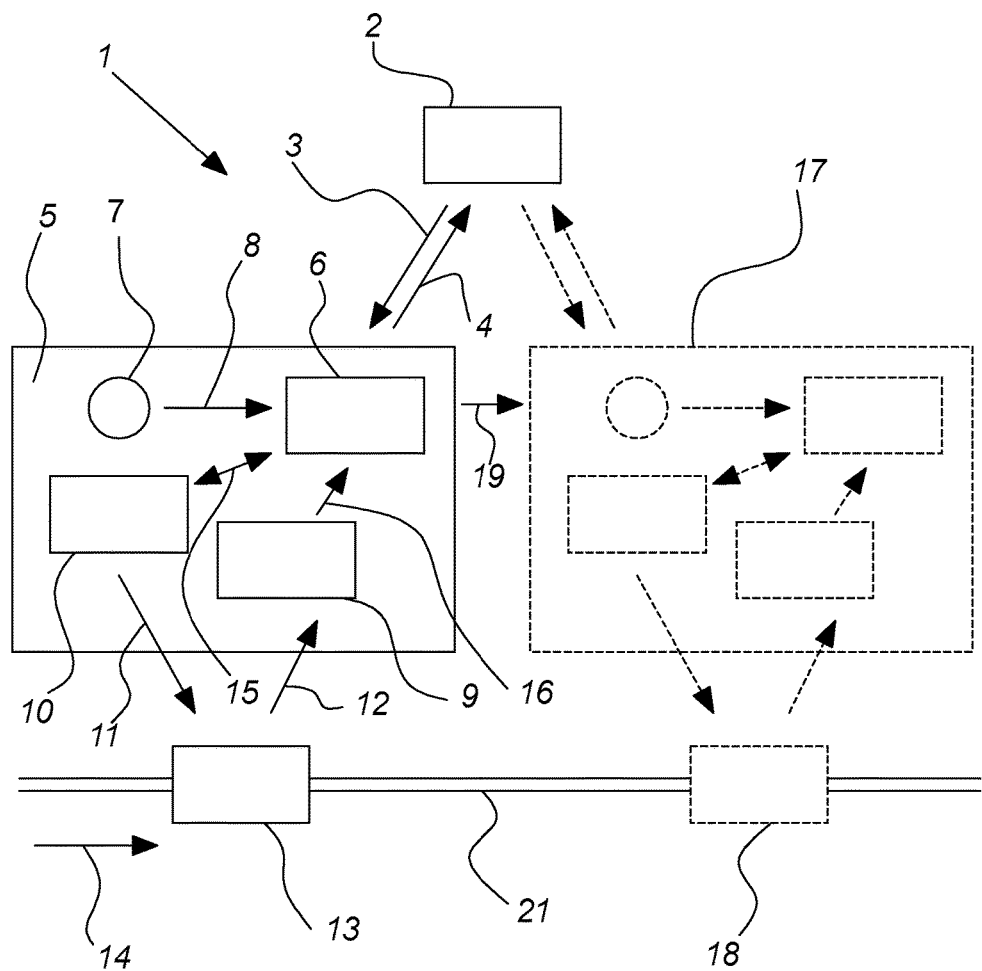
FIG. 3 is a schematic illustration of a test system and more detailed test box according to an embodiment of the invention.

FIG. 3 is a schematic illustration of the test system 1 of FIG. 1, showing the test box 5 in more detail according to an embodiment of the invention. FIG. 3 further illustrates that one or more additional consumption meters 18, and/or one or more additional test boxes 17 may be comprised in the test system 1. The reference device 20 is not shown in the drawing of FIG. 3, but may be implemented as described above with reference to FIG. 1, or any of the alternative embodiments described below.

The common control unit 2 is used for control of the test and calibration procedure, registration and computation of data from the consumption meters 13, 18 and test boxes 5, 17 and comparison of the results with reference values from one or more reference devices 20 (see e.g. FIG. 1 and below).

The common control unit 2 transmits control signals 3 to the test boxes 5, 17 and to the consumption meters 13, 18 (through the test boxes 5, 17), and receives control and data signals 4 from the test boxes 5, 17 and from the consumption meters 13, 18 (through the test boxes 5, 17).

The control signals 3 to the test boxes 5, 17 and the consumption meters 13, 18 typically include commands to the consumption meters 13, 18 to switch from normal operation mode to test mode or vice versa and commands to start and stop the test. The timing of these control signals 3 is in a preferred embodiment not critical, as the commands to start and stop the test only initiates the creation of a common start and stop signals 19 as described further below.

The control and data signals 4 from the consumption meters 13, 18 and the test boxes 5, 17 to the common control unit 2 typically include status information, timing information 8 from the test boxes 5, 17 and measurements 16 from the consumption meters 13, 18. The timing of these signals 4 is in a preferred embodiment not critical either.

In a preferred embodiment, the test box 5 and the common control unit 2 are distributed as illustrated, but are in other various embodiments integrated as one device. In various preferred, distributed embodiments, the communication 3, 4 between the common control unit 2 and the test boxes 5, 17 takes place using a wired communication channel, preferably an Ethernet connection, possible also with transmission of power from the common control unit 2 to the test boxes 5, 17, so-called "power over Ethernet".

Because of the testing and calibration taking place in an environment comprising fluid pipes and working with fluid pipes, including separation and joining of fluid pipes, the fluid typically being water or the like, and a preferred embodiment involving near-field-communication NFC requiring the test box to be placed practically adjacent to the consumption meters, a preferred embodiment comprises the test box 5, 17 configured to be relatively water proof, e.g. to the IP54 or IP65 standard, or better. To that purpose, a preferred embodiment comprises a test box 5, 17 with as few penetrating wires or external connections as possible, whereby the combined communication- and power-connection standard "Power over Ethernet" (PoE) becomes one of various preferred embodiments reducing the number of openings in the test box to as little as one. In an alternative embodiment, a relatively water-resistant test box 5, 17 is battery-powered and communicates with the common control unit 2 by means of, e.g., WiFi, Bluetooth or other wireless communication means, and may be configured for easy replacement of batteries, and/or be compatible with inductive charging.

Each test box 5, 17 comprises a micro controller 6 for handling the communication 3, 4 with the common control unit 2 and time stamping of control and data signals 3, 4, 16 using timing information 8 from a timer unit 7 of the test box 5, 17.

Furthermore, the test box 5, 17 comprises a radio signal receiver 9 for receiving measurement data from the one or more wireless consumption meters 13, 18 using a wireless interface 12 and forwards these data 16 to the micro controller 6 for time stamping before they are transmitted to the common control unit 2. Preferably, the radio communication 12 from the consumption meter(s) to the test box 5, 17 uses the VHF or the UHF frequency band because a relatively high transmission rate is needed, e.g. 12-1000 kBaud, partly due to the relatively large amount of data, partly due to the fact that the timing in an embodiment is critical because the measurement data are transmitted from the consumption meter(s) 13, 18 without any timing information, which is not added until after the transmission of the data to the test box 5, 17 by the micro controller 6. In various embodiments of the invention, the test mode may involve changing to a different radio band, e.g. from a band in the MHz-range, to e.g. the 2.4 GHz band. Because of the short transmission distance in preferred embodiment, the change may be feasible even without appropriate antenna dimensioning, tuning, etc.

The test box 5, 17 comprises a radio signal transmitter 10 in connection 15 with the micro controller 6 for wireless communication 11 of control information to the consumption meter 13, 18, typically in the form of commands to switch from normal operation mode to test mode or vice versa. Preferably, this communication interface 11 is a passive interface, such as a Near Field Communication (NFC) interface, but may in various embodiments comprise other wireless communication technologies. In various other embodiments, the wireless communication 11 may be established by other wireless, preferably short-range, technologies, e.g. optical communication. The timing of these control signals 11 is not critical.

A common start and stop signals 19 for all test boxes 5, 17 and the one or more reference devices 20 are generated by a single unit, which may, for instance, be one of the test boxes. However, the start and stop signals 19 may be generated and transmitted to the test boxes 5, 17 and reference devices by any source as long as the generation of the signals 19 is initiated from the common control unit 2. The timing of these signals 19 is critical in the sense that the signals 19 must be received by all participating test boxes 5, 17 and reference devices 20 simultaneously in order to ensure that the test period during which data are collected is the same for all the consumption meter(s) 13, 18 and for reference device(s) 20.

When a start or a stop signal 19 is received by a test box 5, 17, it is time stamped and the information is transmitted to the common control unit 2. Then, the common control unit 2 can calculate the, e.g., volume of fluid registered by the consumption meter(s) 13, 18 during the test period between the start and the stop signal 19 very accurately, determining the start and stop volume of each consumption meter 13, 18 by linear interpolation between the representations of accumulated volume in data packages received from the given consumption meter 13, 18 immediately before and after the start or stop signal 19, respectively.

The time stamping of the data packages in the test boxes 5, 17 can be done in different ways. In one embodiment, for instance, each data package transmitted by connection 4 from a test box 5, 17 to the common control unit 2 contains:

1. The original data package from the consumption meter 13, 18 including the consumption meter ID,
2. A time stamp from the test box 5, 17 indicating the time of reception of the data package from the consumption meter 13, 18,
3. A time stamp from the test box 5, 17 indicating the time of the most recently received common start signal 19,
4. A time stamp from the test box 5, 17 indicating the time of the most recently received common stop signal 19, and
5. A test box ID indicating which test box 5, 17 has transmitted the data packages.

The inclusion of the last three parts (items 3-5) means that the common control unit 2 is able to interpret the time stamps correctly, even if there is a relative difference between the times recorded by the individual test boxes 5, 17. Thus, there is no need to synchronize the timer units 7 of the different test boxes 5, 17.

Items 3 and 4 can be used to determine, whether a start signal or a stop signal 19 has been received between the two most recently received data packages, i.e. in order to make an interpolation to determine a start volume or a stop volume as described above. If no common start signal or no common stop signal has been received yet, the corresponding field may in various embodiments be populated with zero, undefined, NULL, or other appropriate indication, or be omitted if the data structure and communication protocol allows it.

Various preferred embodiments make use of the above-described interpolation to calculate a start value and a stop value from the measurement values, and use the difference between the calculated start and stop values as a calibration value to be compared with the reference value from the reference device, typically in terms of a volume of fluid that has passed the consumption meter during the period between the start signal and the stop signal.

Various alternative embodiments instead of interpolating the measurement values, determine the actually measured start and stop values that were measured closest to the common start and stop signal to determine a measured calibration value related to the time difference between the timestamps of the actual measurements, and then use the proportion between this time difference and the time difference between the common start and stop signals to determine a calibration value related to the start-stop period which can be compared with the reference value from the reference device.

It is noted that in addition to the two above-mentioned principles also other methods and variants of converting the measurements and measurement timing to values comparable to the reference value and timing, or vice versa, exist, as will be known to the person skilled in the arts of statistics and data analysis, and which principles, methods and variants are thereby considered within the scope of the present invention. In a preferred embodiment the principle to apply is determined in consideration of which principle introduces the smallest uncertainty margin based on comparing measurement-, timing- and calculation uncertainties, rounding errors, reference value uncertainties, etc., of the particular implementation, or by balancing methods that introduce smaller uncertainty margins with methods that require less calculation power or time.

The consumption meter 13 being tested and calibrated in the illustrated embodiment is a water flow meter. A common water flow 14 passes the consumption meter 13 and, if relevant, one or more other consumption meters 18 also being tested and calibrated and one or more reference devices 20.

The consumption meters 13, 18 being tested and calibrated are arranged in a series, and the one or more reference devices 20 are typically arranged either before the first consumption meter 13 in the series and/or after the last consumption meter 18 in the series. If placed before the series of consumption meters 13, 18, e.g. as illustrated in FIG. 1, the reference device 20 may preferably be a device creating and defining the water flow 14 passing through the consumption meters 13, 18, such as for instance a calibrated piston. Further, if a reference device 20 is placed before the series of consumption meters 13, 18, this reference device 20 is typically used as the source of the common start and stop signals 19 for all the test boxes 5, 17.

Figure 4:
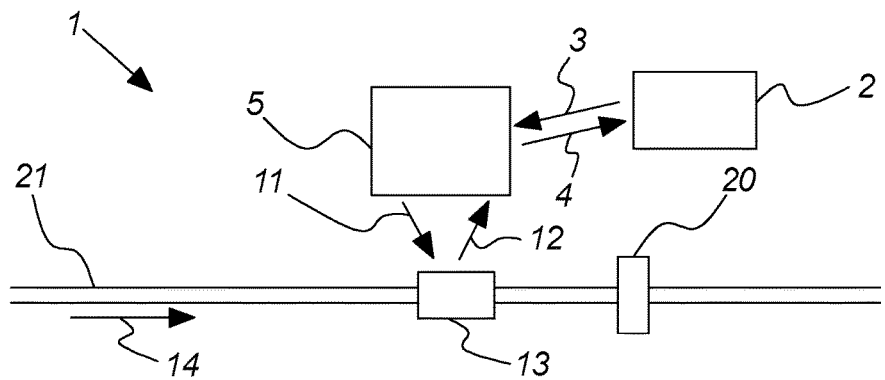
FIG. 4 is a schematic illustration of a test system with an alternative reference device according to an embodiment of the invention.
Figure 5:
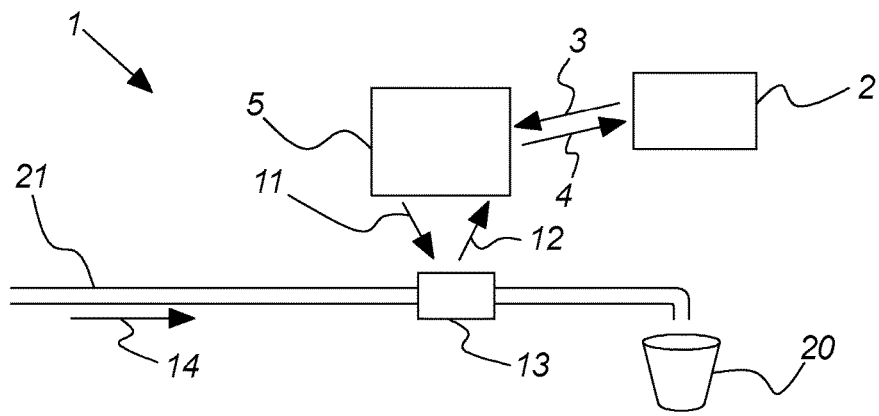
FIG. 5 is a schematic illustration of a test system with a simple reference device according to an embodiment of the invention.

FIGS. 4 and 5 illustrate example of various embodiment where the reference device 20 is located downstream the consumption meters 13, 18 being tested. In such embodiments the reference device 20 is preferably a device that is able to meter very accurately the water flow 14 passing through it, such as for instance a water flow meter that has already been tested and calibrated (see example in FIG. 4). Alternatively, as illustrated in FIG. 5, if placed after the series of consumption meters 13, 18, the reference device 20 can be any device, in this example a simple bucket, which by means of for instance weight measurements or volume indications, is able to meter very accurately the water flow 14 leaving the last consumption meter 18 in the series. Preferably the bucket 20 is part of a diverter-and-scale-setup. In all cases, the reference device(s) 20 must be able to provide a reference value used for test and calibration of the consumption meters 13, 18, e.g. an accumulated volume of fluid during the period between the common start signal and the common stop signal.

Figure 6:
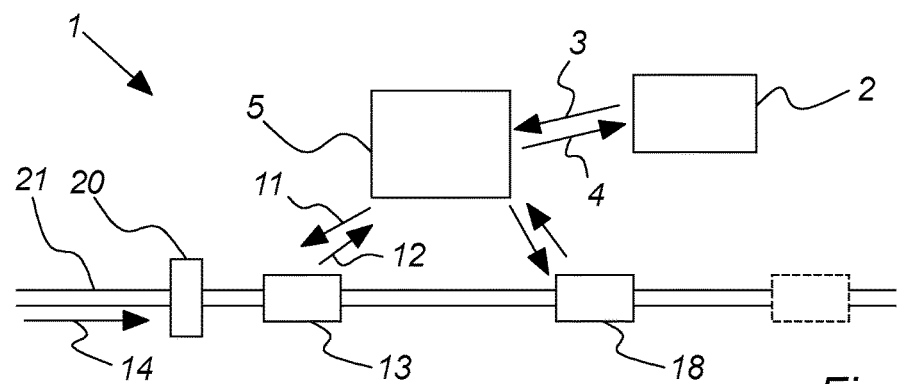
FIG. 6 is a schematic illustration of a test system with several consumption meters according to an embodiment of the invention.

In the illustrated embodiments, the consumption meter 13 is tested and calibrated using a test box 5, whereas the next consumption meter 18 in the series is tested using another test box 17. In other embodiments, e.g. as illustrated in FIG. 6, the test box 5 can be used for simultaneous test of more than one consumption meter 13, 18. In other various embodiments the data packages from a given consumption meter 13, 18 are transmitted to more than one test box 5, 17.

In a preferred embodiment of the invention, the test system 1 is operated by an operator first establishing a fluid pipe 21 with the participating consumption meters 13, 18 connected at suitable intervals, and further at least one reference device 20 somewhere along the fluid pipe 21, and an upstream fluid supply, e.g. a water tap. The downstream end of the fluid pipe may be connected to the upstream end in order to save and reuse the fluid, and a fluid pump may be provided to force a flow in a circularly connected fluid pipe.

Next in a preferred embodiment, the consumption meters 13, 18 that should participate in the test and calibration are each set to test mode, in a preferred embodiment by the operator approaching each NFC-enabled consumption meter with an NFC-communicating test box. The switch to test mode causes the consumption meter to change to a test algorithm and to apply the test mode parameters TMP to the radio communication 12. The test mode parameters TMP may in an embodiment be retrieved from the parameter storage PS or alternatively be provided and/or negotiated by the test box by means of the NFC link. The test mode, among other things, makes the consumption meter(s) 13, 18 start transmitting fluid measurement values by data channel 12 to the test box at a rate faster than the normal operation mode. In an alternative embodiment an additional step of sending a start signal, e.g. from the common control unit 2, is required for making the consumption meters start transmitting frequent measurements.

When all participating consumption meters 13, 18 have been set to test mode and have started transmitting frequent fluid measurement values through the test boxes 5, 17 to the common control unit 2, the common start signal 19 is transmitted. It may e.g. be initiated by the common control unit 2, or as described above, by the reference device 20. The common start signal 19 should preferably be received simultaneously at all test boxes. In a preferred embodiment a wired connection between the test boxes ensures that. In an embodiment the common control unit uses the time stamps from the different test boxes to correct slight misalignments. In an embodiment the radio receivers 10 of the test boxes are used to receive the common start signal. The timestamp of the common start signal 19 is recorded by the test box(es) 5, 17, and this value appended to all measurement values forwarded from the consumption meters 13, 18, to the common control unit 2. Thereby it is possible for the common control unit 2 to determine in between which two measurement values from a particular consumption meter that the common start signal was given, and thereby to interpolate a start value, e.g. accumulated volume of fluid.

The testing goes on for a while, the particular period determined as preferably as short as possible to not unnecessarily consume battery power from consumption meters and due to production costs for time spent with testing, while still long enough to obtain a desired or required resolution and accuracy of the measurement results, taking into consideration e.g. the consumption meter measuring tolerances, the fluid flow rate and flow velocity, hostility of the environment e.g. in terms of disturbing radio frequency noise, etc. In various preferred embodiments, the test period may be in the range of 10 seconds to 2 minutes, in other embodiments up to e.g. one hour. In various embodiments only a single start signal and single stop signal is transmitted during the entire test period. In other embodiments several individual tests are performed sequentially during the test period.

When the testing phase should end, the common stop signal 19 is transmitted. It may preferably be initiated by the same unit that initiated the common start signal. The timestamp of the common stop signal 19 is recorded by the test box(es) 5, 17, and this value appended to all measurement values thereafter forwarded from the consumption meters 13, 18, to the common control unit 2. Thereby it is possible for the common control unit 2 to determine in between which two measurement values from a particular consumption meter that the common stop signal was given, and thereby to interpolate a stop value, e.g. accumulated volume of fluid.

By analysing the determined start value and stop value from a particular consumption meter, e.g. by subtracting the start value from the stop value in the case of the value being accumulated fluid volume, a resulting measurement value for that particular consumption meter is obtained. This value can be compared to the reference value obtained from the reference device 20, and—if necessary—a corresponding calibration performed.

The consumption meters 13, 18 are again switched back to normal operation mode, and thereby stop sending measurement values at super-normal rate. Alternatively a dedicated stop signal is transmitted to the consumption meters e.g. by the common control unit 2 before they are switched back to normal operation mode.

As mentioned above, the consumption meters transmit data packages frequently when in test mode, but still with the data packages separated by a transmission interval. If more than one consumption meter starts transmitting data packages at the same time and using the same transmission interval and transmission frequency, the data packages may not be properly received by the test box(es) from any of the more than one consumption meters because of signal interference.

In an embodiment the risk of this happening may be prevented by having the different consumption meters apply different transmission intervals between transmissions. As a preferred embodiment is already configured to handle when no measurement is made at the relevant start or stop time, by performing interpolation between two consecutive measurements, the different transmission intervals used in different consumption meters will not affect the interpolation, and in turn also not the calibration results. However, by letting the consumption meters perform periodic transmissions at different rates, the different consumption meters will still disturb each other regularly in a way similar to periodic interference between two periodic signals of different frequency.

In a preferred embodiment the consumption meters instead utilize differently varying transmission intervals to reduce the risk of transmission time collision. The transmission interval variation should be random or pseudo-random in order to minimize the risk of colliding with another consumption meter. If no periodicity exists in the variation of the transmission interval, there is a small probability for a few transmissions colliding, but without any predictability or regular repetition. In an embodiment a few lost data packages due to collision are acceptable, because of the many measurements and the interpolation feature.

Various embodiments of the invention utilise different methods and algorithms for applying pseudo-random transmission intervals. If both the measurement time and the transmission time is determined by the transmission interval, i.e. that it is the measurement time that is variably delayed but the measured value is transmitted immediately after measurement, then the test and calibration system is generally not affected, as the test box timestamps the measurements when they are received, and the interpolation features makes the calibration algorithm robust to random or irregular measurement times.

However, in a preferred embodiment, it is desirable to perform the measurements at regular intervals, for example to be able to reduce impact from environmental noise sources such as e.g. 50 or 60 Hz noise from electrical mains, or because of legal requirements for calibration and certification. Hence, if the measurements are preferably performed regularly, but transmitted at a later, preferably pseudo-random point in time, the test box which in the above-described embodiments takes care of timestamping the measurements to save data package size, will need to be provided either with information about the applied transmission interval, e.g. by inclusion in the data packages, or the consumption meter will need to include the timestamp in the data package payload.

In a preferred embodiment, in order to save data package size, instead of simply including the transmission interval value in the payload, the transmission interval is determined on the basis of a piece of information that is also available to the test box, whereby the test box is also able to generate an equal sequence of pseudo random transmission intervals. This may e.g. be obtained by using a piece of information from the data packages as seed for a pseudo-random number generator algorithm, e.g. the consumption meter ID, or the consumption meter may once in a while send a special data package comprising information enabling the test box to establish the random transmission interval sequence.

In a particularly preferred embodiment, the transmission interval is determined on the basis of the checksums of the data package or a part thereof, e.g. the last byte in the data package. This is particularly advantageous as a checksum is included in each data package and is independent from earlier values, thereby providing all the information required without need for synchronization or negotiation of a transmission interval sequence. Further, it is calculated from the package content including e.g. an ever-changing measurement value that depends on the externally-controlled fluid flow, and (a part of) a consumption meter ID which is unique for each consumption meter. According to this preferred embodiment, the consumption meter may therefore perform a measurement at the locally controlled, preferably regular interval, prepare the data package, calculate the checksum, and determine a transmission interval based on, e.g., the last byte thereof. When the determined transmission interval has passed, the data package is transmitted. Upon receipt in the test box, a time stamp is retrieved from the timer, but before the time stamp is associated with the data package and measurement, the transmission interval indicated by the checksum, e.g. determined from the last byte thereof, is subtracted from the timestamp, thus converting the timestamp to the point in time where the measurement actually took place. In an example embodiment, the transmission interval between data packages may e.g. be the value of the last 7 or 8 bits of the checksum offset by a fixed minimum or mean transmission interval, and/or applied with a factor, making the transmission interval e.g. between −63 and +64 ms (7 bits) offset by 400 ms resulting in transmission intervals fluctuating between 337 ms and 464 ms, or e.g. between 0 and 255 (8 bits) multiplied by 2, resulting in transmission intervals fluctuating between 0 ms and 510 ms. In an embodiment, the checksum may not directly indicate the transmission interval, but be used as input to a function or look-up table for determining an appropriate transmission interval based on the checksum value.

LIST OF REFERENCE NUMBERS

1. Test system
2. Common control unit
3. Control signal from control unit to test boxes and consumption meters
4. Control and data signal from test boxes and consumption meters to control unit
5. Test box
6. Micro controller in test box
7. Timer unit
8. Timing information from timer unit
9. Radio signal receiver
10. Radio signal transmitter
11. Wireless interface from test box to consumption meter
12. Wireless interface from consumption meter to test box
13. Consumption meter
14. Water flow through test system
15. Communication between micro controller and radio signal transmitter
16. Communication from radio signal receiver to micro controller
17. Next test box in the test system
18. Next consumption meter to be tested
19. Common start and stop signal
20. Reference device
21. Fluid pipe
PS. Parameter storage
NMP. Normal operation mode parameters
TMP. Test mode parameters

The invention claimed is:

1. A wireless consumption meter for measuring one or more values relating to a fluid flowing in a connected fluid pipe system, the wireless consumption meter being arranged with at least two modes of operation comprising at least
a normal operation mode having associated a normal operation algorithm, and
a test mode having associated a test mode algorithm different from the normal operation mode algorithm;
the wireless consumption meter comprising a parameter storage which at least comprises wireless communication parameters that the wireless consumption meter is arranged to use for wireless transmission of measurement data to an external device;
the wireless communication parameters at least comprising
transmitting signal power,
baud rate, and
data package type;
and wherein a value of at least one of the wireless communication parameters is different when the wireless consumption meter is set to test mode compared to when set to normal operation mode, in accordance with one or more of:
transmitting signal power being lower in test mode than in normal operation mode,
baud rate being higher in test mode than in normal operation mode, and data package type being a type of generally smaller size in test mode than in normal operation mode.

2. The wireless consumption meter according to claim 1, wherein the wireless communication parameters comprise one or more of:
- a transmission interval being smaller in test mode than in normal operation mode, and
- a modulation method being of a more spectrum-efficient type in test mode than in normal operation mode.

3. The wireless consumption meter according to claim 1, wherein a transmission interval in test mode varies between transmissions.

4. The wireless consumption meter according to claim 3, wherein the transmission interval variation is derived from a checksum of a data package that is to be transmitted so that a receiver of the data package may be able to determine the applied transmission interval variation.

5. The wireless consumption meter according to claim 1, wherein the wireless consumption meter comprises a control input and is arranged to enable an external device via said control input to control one or more of:
- change from normal operation mode to test mode,
- start and stop measuring,
- start and stop transmitting, and
- change of the wireless communication parameters in said parameter storage.

6. The wireless consumption meter according to claim 1, wherein the wireless consumption meter is an ultrasonic flow meter.

7. A method for a wireless consumption meter to engage in a consumption meter test session, the wireless consumption meter being arranged to measure one or more values relating to a fluid flowing in a connected fluid pipe system, and the wireless consumption meter is arranged with at least two modes of operation comprising at least
- a normal operation mode having associated a normal operation algorithm, and
- a test mode having associated a test mode algorithm different from the normal operation mode algorithm;

the method comprising the steps of:
- changing mode of operation to said test mode;
- measuring a value relating to said fluid flow;
- transmitting a data package comprising a representation of said measured value, the transmission being performed in accordance with wireless communication parameters comprising transmitting signal power, baud rate, and data package type;
- repeating the measuring and transmitting steps;

wherein the transmission of data packages in said test mode is performed by the wireless consumption meter in accordance with one or more of:
- transmitting with a lower transmitting signal power than in normal operation mode,
- transmitting at a higher baud rate than in normal operation mode, and
- transmitting generally smaller data packages than in normal operation mode.

8. A method for test and calibration of wireless consumption meters, comprising the steps of:
- arranging sequentially one or more consumption meters and a reference device in any order with a fluid pipe system to allow fluid to flow through the consumption meters and said reference device;
- providing one or more test boxes in wireless communication with the consumption meters;
- making the consumption meters, which are arranged to operate in accordance with at least a normal operation mode and a test mode, change to the test mode;
- transmitting from the consumption meters, via said wireless communication, data packages to the test boxes, the data packages comprising representations of measured values related to said fluid;
- establishing a test or calibration result for one or more of said consumption meters on the basis of said data packages;

wherein said step of transmitting data packages from the consumption meters, in test mode, are performed in accordance with one or more of:
- transmitting with a lower transmitting signal power than in normal operation mode,
- transmitting at a higher baud rate than in normal operation mode, and
- transmitting generally smaller data packages than in normal operation mode.

9. The method for test and calibration of wireless consumption meters according to claim 8, wherein the method comprises a step of transmitting a common start signal to all the test boxes simultaneously, after the consumption meters have been changed to test mode; and a step of transmitting a common stop signal to all test boxes simultaneously, after the common start signal has been sent; and wherein said step of transmitting data packages is repeated several times between said common start and stop signals.

10. The method for test and calibration of wireless consumption meters according to claim 9, wherein the step of transmitting a common start signal and the step of transmitting a common stop signal is initiated by a common control unit.

11. The method for test and calibration of wireless consumption meters according to claim 8, wherein the step of establishing a test or calibration result for a particular consumption meter involves determining a start value and a stop value based on measured values by interpolation to the time of the common start and stop signal, respectively, based on received measured values measured before and after the time of the common start and stop signal, respectively.

12. The method for test and calibration of wireless consumption meters according to claim 8, wherein the step of establishing a test or calibration result is performed by a common control unit communicating with the test boxes; and wherein the test boxes enhances, by appending at least a time stamp, the one or more data packages received from the consumption meters and forwards the enhanced data packages to the common control unit.

13. The method for test and calibration of wireless consumption meters according to claim 12, wherein the appending of a time stamp involves calculating a measurement time from a data package reception time by subtracting a transmission interval variation.

14. The method for test and calibration of wireless consumption meters according to claim 8, wherein at least one of the wireless consumption meters to be tested is a wireless consumption meter being arranged with at least two modes of operation comprising at least
- a normal operation mode having associated a normal operation algorithm, and
- a test mode having associated a test mode algorithm different from the normal operation mode algorithm;

the wireless consumption meter comprising a parameter storage which at least comprises wireless communication parameters that the wireless consumption meter is arranged to use for wireless transmission of measurement data to an external device;
the wireless communication parameters at least comprising
    transmitting signal power,
    baud rate, and
    data package type;
and wherein a value of at least one of the wireless communication parameters is different when the wireless consumption meter is set to test mode compared to when set to normal operation mode, in accordance with one or more of:
    transmitting signal power being lower in test mode than in normal operation mode,
    baud rate being higher in test mode than in normal operation mode, and
    data package type being a type of generally smaller size in test mode than in normal operation mode.

15. A test and calibration system for wireless consumption meters, comprising one or more test boxes, one or more reference devices and a fluid pipe system;
    the reference devices and fluid pipe system being arranged in sequential connection in any order with one or more wireless consumption meters to be tested; the arrangement being configured for the consumption meters to measure one or more values relating to a fluid flowing in the fluid pipe system;
    the one or more test boxes comprising a radio signal receiver for wirelessly receiving data packages comprising measurements from said wireless consumption meters to be tested;
    wherein the radio signal receiver is arranged to receive data packages that are transmitted in accordance with a consumption meter test mode different from a consumption meter normal operation mode, and wherein the radio signal receiver correspondingly is arranged to receive data packages under circumstances of one or more of:
        transmitting signal power being lower than in normal operation mode,
        baud rate being higher than in normal operation mode, and
        data package type being a type of generally smaller size than in normal operation mode.

16. The test and calibration system according to claim 15, wherein at least one of the wireless consumption meters to be tested is a wireless consumption meter being arranged with at least two modes of operation comprising at least
    a normal operation mode having associated a normal operation algorithm, and
    a test mode having associated a test mode algorithm different from the normal operation mode algorithm;
the wireless consumption meter comprising a parameter storage which at least comprises wireless communication parameters that the wireless consumption meter is arranged to use for wireless transmission of measurement data to an external device;
the wireless communication parameters at least comprising
    transmitting signal power,
    baud rate, and
    data package type;
and wherein a value of at least one of the wireless communication parameters is different when the wireless consumption meter is set to test mode compared to when set to normal operation mode, in accordance with one or more of:
    transmitting signal power being lower in test mode than in normal operation mode,
    baud rate being higher in test mode than in normal operation mode, and
    data package type being a type of generally smaller size in test mode than in normal operation mode.

17. The test and calibration system according to claim 15, wherein the test and calibration system is arranged to transmit a common start signal to all the test boxes simultaneously, after the consumption meters have been set to test mode; and wherein the test and calibration system is arranged to transmit a common stop signal to all the test boxes simultaneously, after the test boxes have received several data packages from each of said consumption meters to be tested.

18. The test and calibration system according to claim 15, wherein the test and calibration system comprises a common control unit communicatively coupled to the test boxes; wherein the common control unit is arranged to perform the establishing a test or calibration result; and wherein the test boxes comprises a timer unit and a micro controller arranged to enhance, by appending at least a time stamp from said timer unit, the data packages received from the consumption meters; and the test boxes further being arranged to forward the enhanced data packages to the common control unit.

19. The test and calibration system according to claim 18, wherein the communicative coupling between the test boxes and the common control unit comprises a network.

20. The test and calibration system according to claim 15, wherein the test boxes are configured to be water proof at least to the IP54 standard.

* * * * *